Feb. 28, 1950 J. B. WALKER 2,498,746

MAGNETIC SOUND RECORDING APPARATUS

Filed Dec. 19, 1944 2 Sheets-Sheet 1

INVENTOR.
JOSEPH B. WALKER,
BY Westall and Westall
ATTORNEYS

Feb. 28, 1950 J. B. WALKER 2,498,746

MAGNETIC SOUND RECORDING APPARATUS

Filed Dec. 19, 1944 2 Sheets-Sheet 2

INVENTOR.
JOSEPH B. WALKER,
BY Westall and Westall
ATTORNEYS

Patented Feb. 28, 1950

2,498,746

UNITED STATES PATENT OFFICE 2,498,746

MAGNETIC SOUND RECORDING APPARATUS

Joseph B. Walker, Hollywood, Calif.

Application December 19, 1944, Serial No. 568,846

9 Claims. (Cl. 179—100.2)

This invention relates to apparatus for recording and reproducing sound, and more specifically appertains to a novel arrangement of conventional elements essential for effecting the recordation of sound upon tape, which contemplates the support of the tape in helical form with the convolutions thereof separable for selective engagement by a recording unit, operable to transform electrical impulses corresponding in frequency, amplitude and period with received sound waves into magnetic pulsations and to impress the latter upon the recording medium.

In the art prior to my invention, apparatus for magnetically recording on steel tape has been devised which involves, essentially, a recording head in contact with which the tape is moved to receive thereon or transmit therefrom the sound record, the tape being carried upon reels. In the operation of such devices the tape is run from a storage reel through the recording head to receive the record and is rewound upon a take-up reel. For reproduction or deletion of any part of the record and new recordation, the tape must be shifted from reel to reel by rewinding in order to return the tape or desired length thereof into contact with the recording unit. Due largely to the necessity for this time-consuming reeling of the tape, which must be handled carefully to avoid fracture or other injury to the record, this type of recording media has met with little commercial success, with a consequent loss of its numerous inherent advantages.

In my Patent No. 293,299, dated August 18, 1942, for Method and means for recording, one method of overcoming the objections outlined above is disclosed, which consists generally of loosely mounting the tape circumferentially on a rotatable drum, the recording instrument being movable longitudinally of the drum, whereby the instrument may be shifted quickly into contact with any annulus of the tape for further recording or reproduction, or, in embodiments utilizing magnetism as a recording expedient, erasing of sound impressions.

It is a principal object of the present invention to provide novel and improved apparatus adapted for the performance of the method of my patent, above referred to, embodying means for carrying the tape in coiled condition with the convolutions thereof spaced from one another, whereby the sound transmitting unit, movable radially of the coiled tape, may be shifted into contact with any one of the coils for recording on or reproducing from the record carried by the length of tape so engaged.

More specifically, an object of the invention is to provide a rotatable reel upon which the tape is loosely coiled, incorporating means for spacing successively wound convolutions of the tape, and thereby enable the operative engagement of any reach thereof by the sound transmitting unit.

Another object is the provision of a compact sound recording and reproducing unit utilizing a record medium of greater cross-sectional width than thickness, in combination with supporting means therefor upon which the medium is adapted to be wound with each entire edge of the latter lying in the same plane, said supporting means being effective to carry successive reaches of the tape, without tension thereon, through sound transmitting mechanism supported by the tape.

Still another object is the provision of a reel having a plurality of spokes radiating from one edge of a hub on which the tape is wound, to engage in cut-outs formed in one edge of the tape, the cut-outs being of sufficient size and spaced progressively greater distances apart from the innermost to the outmost convolutions of the tape whereby the overlying reaches of successive convolutions of tape loosely wound on the reel may be shifted radially to spread convolutions on either side of a length of tape upon or from which a record is to be transmitted for the accommodation of a transmitting unit in operative engagement with the reach of tape thus isolated.

Another object is to provide a perforated tape, adapted to be loosely coiled upon a reel, the perforations in each convolution thereof being arranged in different radii of the reel, and in alignment with perforations of adjoining convolutions of tape for the extension therethrough of rods by which the coil may be supported, and the convolutions thereof maintained in a loose separable condition.

Other novel features of construction and arrangement of the essential elements, which are conducive to simplicity of operation, economy of manufacture, durability, and the maintenance of light but positive contact between the tape and transmitting head, will be apparent from a reading of the following description of one embodiment of my invention, illustrated in the accompanying drawings, in which—

While in the accompanying drawings I have illustrated two embodiments of my invention which are both adapted for magnetic recording and reproducing, it will be understood that the novel features hereof are equally well suited to other methods of recording on tape and that conventional apparatus required for such other types of recording may be substituted where necessary or desired without loss of the advantage of the present improved construction.

Figure 1:
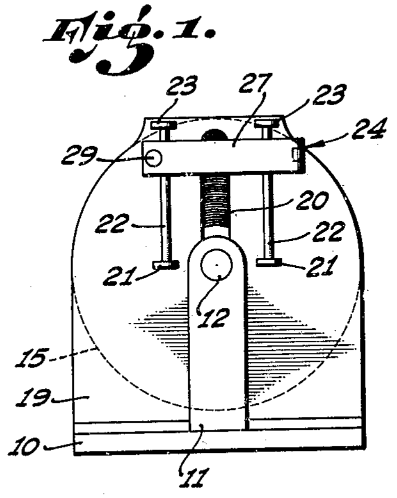
Fig. 1 is a side elevation of one embodiment of my invention, illustrating the disposition of the guide means for the transmitting unit with respect to the reel by which the tape is carried.
Figure 2:
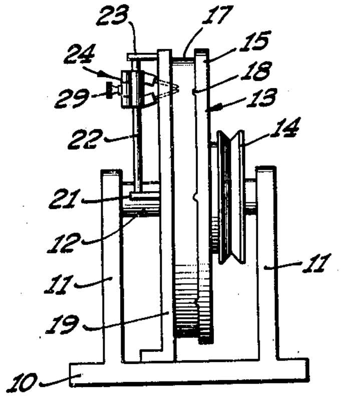
Fig. 2 is an end elevation taken at a point ninety degrees from the point of view depicted in Fig. 1.
Figure 3:
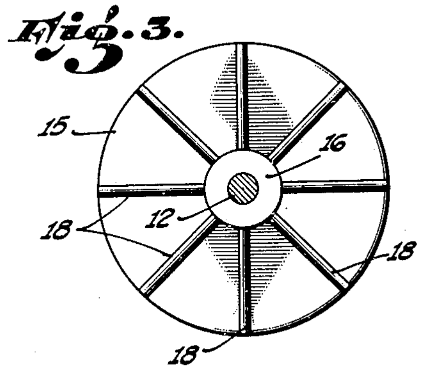
Fig. 3 is a side elevation of the tape-carrying reel of Figs. 1 and 2.
Figure 4:
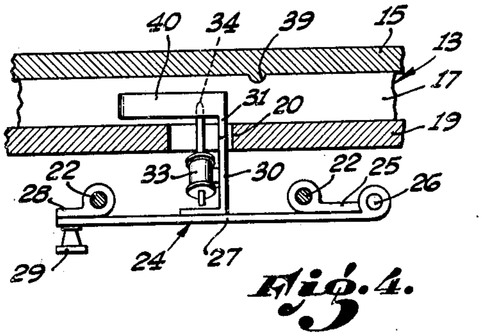
Fig. 4 is a plan view of a length of tape with the transmitting head and its associated mechanism shown in position for recording on, or reproducing or erasing a record from the tape.
Figure 6:
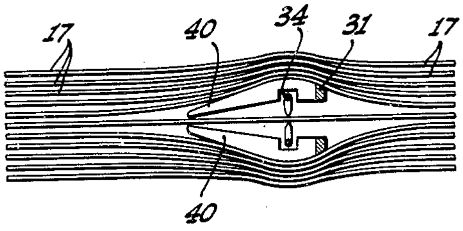
Fig. 6 is an end elevation of the transmitting unit in the position and relation to the tape shown in Fig. 5.
Figure 5:
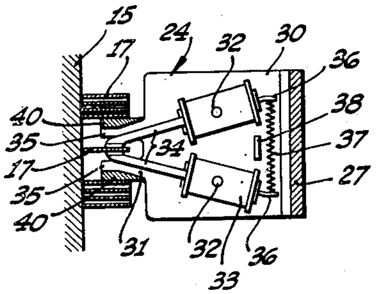
Fig. 5 is an elevation of the transmitting unit, illustrated in operative contact with one convolution of tape, adjacent convolutions being shown on either side thereof.

Referring primarily to the embodiment of Figs. 1 through 6 of the drawings, the numerals of which indicate similar parts throughout the several views, 10 designates a base upon which the entire unit is supported, having a pair of upstanding posts 11 integral therewith or attached by suitable means at opposite sides of the base. Bearings (not shown) in the upper ends of the respective posts provide journals for opposite ends of a horizontal shaft 12. A tape-reel, generally indicated by numeral 13, secured on shaft 12 is adapted to be rotated with the latter by means of a pulley 14. The pulley is actuated by mechanism (not shown) comprising a motor and a V-belt, as will be obvious.

The reel 13 comprises a circular disk 15 having secured thereto a concentric offset hub 16, around which the tape 17, to be magnetically sensitized, is coiled. Hub 16 is of a thickness substantially equal to the width of the tape for a purpose hereinafter more fully described. Radiating from hub 16 are a plurality of equi-spaced spokes 18, lying contiguous with the adjacent surface of disk 15 and extending to the periphery of the latter. A panel 19, mounted on base 10 extends upwardly parallel to the disk and closely adjacent hub 16. An elongated vertically-disposed slot 20 is located in the upper middle of the panel, through the lower end of which shaft 12 extends, whereby the latter may rotate freely and independently of the panel. The slot 20 is of a length slightly greater than the radius of the coil of tape 17, which reel 13 is adapted to contain, for a purpose about to be described. A pair of short supporting bars 21 project laterally from panel 19 at opposite sides of shaft 12 for the support of the lower ends of vertical guide rods 22—22, respectively, disposed parallel to slot 20 in the panel. The upper end of guide rods 22—22 are secured to bars 23, mounted on panel 19, which bars 23 correspond in size and function to bars 21, respectively.

The sound recording and reproducing unit, generally indicated by the numeral 24, is carried slidably on guide rods 22—22, so as to move radially of the disk. To this end a perforated lug 25 is slidably and rotatably associated with one of the guide rods 22. One end of lug 25 projects laterally and carries a vertical hinge pin 26, on which is pivoted a bar 27 for movement horizontally toward and away from panel 19. A latching lug 28 is slidably mounted on the other guide rod 22, carrying a strike for a latch, generally designated at 29, associated with the free end of bar 27. As the design of the latch and its strike member may be of any type well known in the art and comprise no part of the present invention, it is accordingly not further described or illustrated in detail.

A mounting plate 30 is secured by welding, riveting, or the like, to the side surface of bar 27 nearest adjacent panel 19 in alignment with slot 20 in the latter. The outer end of the plate 30 is reduced in width to form an extension 31, which is adapted to extend through slot 20 into the area between disk 15 and panel 19 when bar 27 is disposed parallel to the panel, and latch 29 engaged. The end of extension 31 is bifurcated for a purpose later referred to. Pivotally supported, one above the other, on pins 32—32, mounted on the side of plate 30, are a pair of electro-magnets 33 having pole pieces 34 extending parallel to plate 30 and terminating just short of the outer extremity of bifurcation 35 of extension 31. A finger 36 projects from the opposite rearward end of each electro-magnet 33 to provide seats for opposite ends of a helical spring 37, operable to resiliently urge poles 34 together. 38 indicates a stop attached to plate 30 between the spring-pressed ends of electro-magnets 33 to limit the compression of spring 37 and, correspondingly, the extent to which the pole pieces may be separated.

The flat steel tape 17, upon which the magnetic impressions are to be registered, is of a width only slightly less than the distance between disk 15 of the reel and panel 19. However, as spokes 18 extend radially through this space between disk 15 and panel 19, tape 17 is provided with a series of notches or cut-outs 39 which accommodate spokes 18, the latter furnishing a means of retaining each convolution of tape in its proper place on the reel. To this end, the notches 39 in tape 17 are spaced apart progressively greater distances from the end thereof to be first placed on the reel, toward the opposite end which is to form the outermost convolution. It is a feature of the present invention that the notches 39 are of a size permitting limited radial movement of any part of tape 17 to a degree sufficient to allow the spreading of adjacent convolutions for the accommodation of the pole pieces 34, and bifurcations 35 of plate 30. The extent of such radial movement of each reach of the tape incident to spreading the convolutions apart is limited by the wedging of the edges of notches 39 between the spokes.

It will be observed (see Fig. 6) that each bifurcation of the plate is bent as at 40 to form a right angle intermediate its ends, being turned in the direction from which the tape moves when the reel is rotated. The bifurcations are tapered to a point for a purpose later referred to.

The operation of my invention is briefly described as follows: With latch 29 disengaged, and the supporting bar 27 swung outwardly from panel 19, the apparatus is in position for reeling the tape. As is well known, the same magnetic recording unit may be utilized for impressing a magnetic record upon, and reproducing or erasing that record from, the tape. Therefore, after tape 17 is coiled on reel 13, it may remain there for repeated use. However, there may be occasions for transferring tape records from a machine in one locality for use in another. Also in utilizing other systems of recording to which my invention is also adapted, a record once made cannot be deleted; a new tape is required for each recording. Accordingly, the means contemplated herein for retaining the tape in proper disposition on the reel is adapted for the facile removal of the tape where that is desired, or necessary.

The leading end of tape 17, i. e., the end in which the notches 39 are spaced more closely together, is turned edgewise in order that it may be inserted into the area between spokes 18 and panel 19. The first notch 39 is then engaged with one of spokes 18, and the portion of the tape in which said notch is disposed is turned parallel to but spaced slightly from the periphery of the hub. Reel 13 is manually turned slightly, and the next notch 39 is similarly engaged and turned parallel to the periphery of the hub. It will be observed that the length of tape between the notches so engaged by the spokes will in effect be wedged between said spokes, so as to resist inadvertent displacement. The reel is then slowly turned either manually or by power driven means to take up the remainder of the tape. The bulk of the tape to be fed onto the reel preferably carried on a spool (not shown) is tilted for convenience in effecting the initial reeling of the tape, so that the length of the tape extending between the disk and panel is twisted at the periphery of the reel, the twist gradually diminishing toward the point of engagement of the second notch 39 with its spoke 18, whereby the portion of the tape adjacent the third notch 39 will only slightly clear contact with the third spoke. As the reel continues to turn, the portion of tape in which the third notch is located is gradually drawn toward the hub, the degree of its twisted condition diminishing. With proper arrangement of the spool of the tape to be wound with respect to reel 13, the alignment of the third notch with the third spoke will occur simultaneously with the assumption of an angular relation between the tape and hub 16, whereby further movement of that portion of the tape longitudinally relative to the reel is precluded. Continued turning of the reel tends to align other spokes 18 and notches 39 in the tape in a like manner. The outer end of tape may be secured to the reel by any conventional clip or clasp (not shown).

With the tape loosely wound on the reel, bar 27, with the transmitting unit supporting thereby, is raised to align the pole pieces 34 with the upper end of slot 20, and is swung toward panel 19. Lug 25 is rotated on guide rod 22 coincidentally with the pivoting of bar 27 on hinge pin 26, whereby the bifurcated ends 35 of plate 30 and the projecting pole pieces 34 are moved through slot 20 perpendicularly to the panel. The pole pieces 34 are spread apart by manually pivoting the electro-magnets on their respective pins 32 against stop 38 to enable the pole pieces to be placed on opposite sides of the outermost convolution of tape 17. Upon release of the electro-magnets, spring 37 is operative to resiliently urge the poles into contact with opposite sides of the tape. Similarly, the bifurcated ends 35 of plate 30 extend to opposite sides of the convolution of tape engaged by poles 34 to space the convolutions of tape above and below the one so engaged, from contact with the pole pieces. The lower bifurcation is adapted to rest on the convolution of the tape therebelow, which affords support for transmitting unit 24. Latch 29 is then secured to retain the transmitting unit and tape in operative contact.

The electro-magnets 33 are then energized by a sound current and, coincidentally, reel 13 is rotated. Any standard equipment may be utilized for producing the sound current, which equipment, being well known and forming no part of the invention, is not illustrated or further described. The magnetic pattern thus produced is impressed upon the steel tape as the latter is moved between poles 34, the speed of reel 13 being synchronized with the frequency of the sound vibrations, as will be apparent to those of skill in the art. As the tape continues to move between poles 34, the transmitting head moves from one convolution of tape to another through slot 20, radially toward the center of the reel, and is guided in the speed of such movement by the engagement of the bifurcated ends 35 of plate extension 31 with the convolutions of tape 17 on either side of the one with which the poles are in contact.

Figure 8:
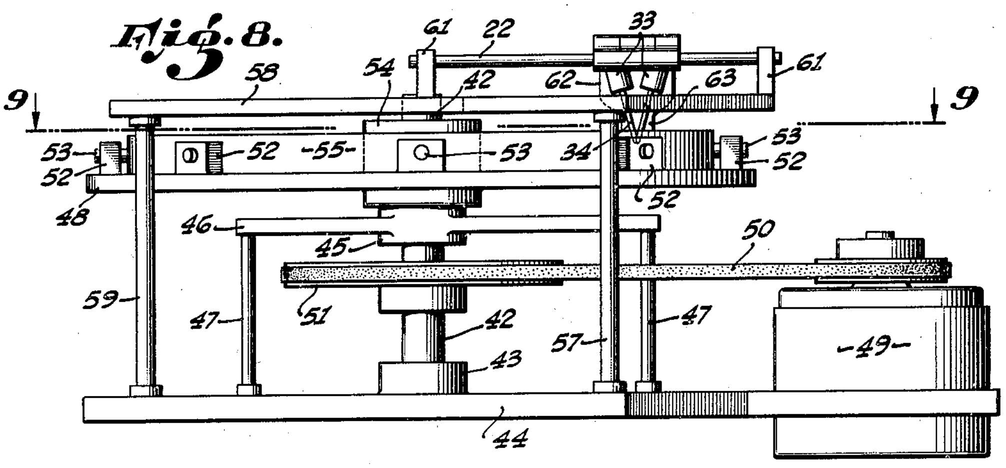
Fig. 8 is an enlarged view in elevation of the apparatus shown in Fig. 7.
Figures 7, 9, 10:
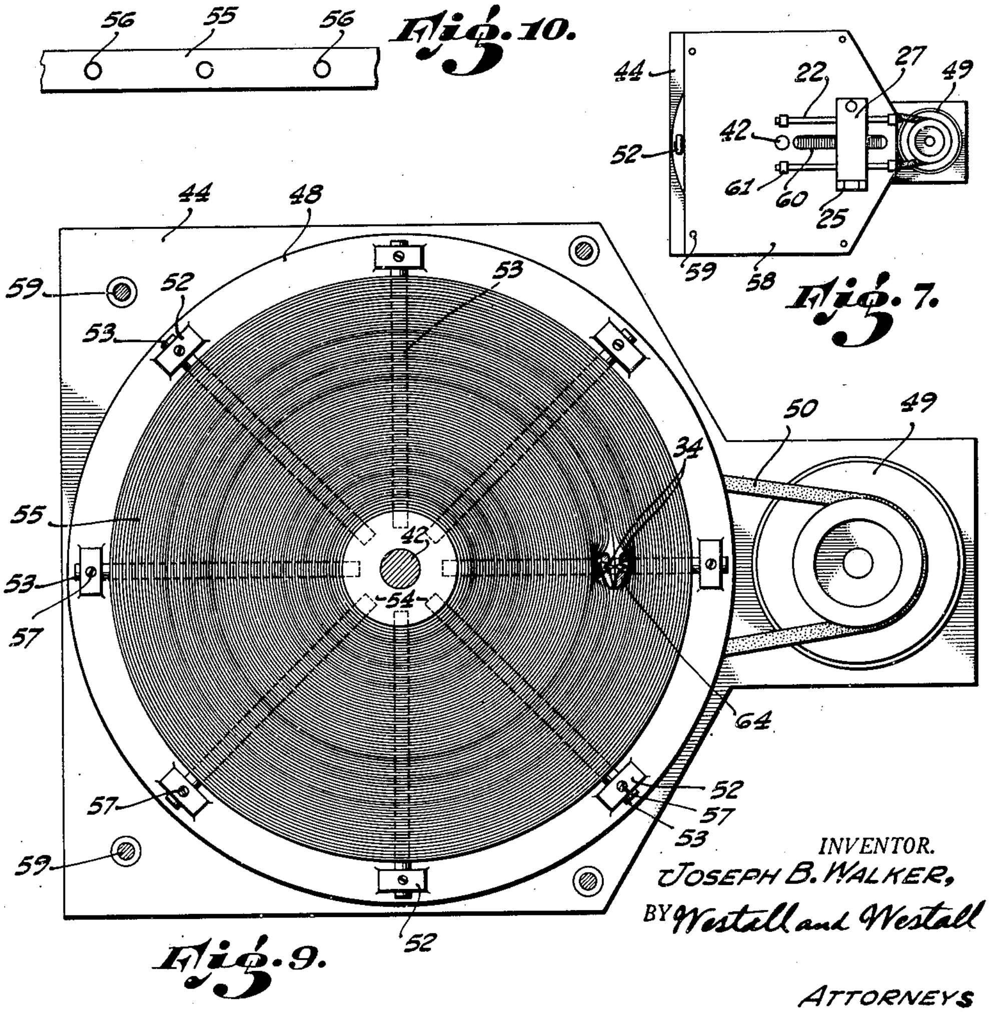
Fig. 7 is a plan view of a modified form of my invention.
Fig. 9 is a sectional view, taken on lines 9—9 of Fig. 8, and showing particularly the tape-engaging ends of the pole pieces, and the means associated therewith for spreading the coils of the tape while the transmitting unit is in recording position.
Fig. 10 is a broken elevation of a section of tape of the character employed in the embodiment of my invention illustrated in Figs. 7-9 inclusive.

In a modified form of my invention, illustrated in Figs. 7 through 10 inclusive, the tape is formed with a plurality of holes spaced progressively greater distances apart from one end thereof to the other. With the tape coiled, rods extend through the holes to perform the dual function of supporting the coil and maintaining the convolutions thereof in a loose separable condition.

The apparatus consists of a vertical spindle 42 journaled in a thrust bearing 43 mounted upon a base 44. The upper end of spindle 42 projects through and is reinforced by a bearing 45, which is carried by a spider 46, supported by posts 47 on base 44. A circular turntable 48, removably carried by spindle 42 adjacent the upper end of the latter is adapted to be rotated by a motor 49 operatively connected thereto by an endless belt 50 which extends over a pulley 51 encircling spindle 42 between the bearings 43 and 45. Secured by suitable means to the upper surface of turntable 48 and adjacent the periphery of the latter, are a plurality of equi-spaced blocks 52. Each block 52 is formed with a hole for the support of a rod 53 of small cross-section extending radially of the turntable. The inner ends of rods 53 project into holes formed in a central hub 54 integral and concentric with the upper surface of turntable 48.

The tape, indicated by numeral 55, employed with the embodiment of my invention here referred to (see Fig. 10) is provided with a plurality of holes 56 located equi-distant between the side edges of tape 55 and spaced progressively greater distances apart from one end to the other. It will be understood that the spacing of these holes, just as the disposition of notches 39 in the embodiment of my invention hereinabove described, is critical, i.e., with tape 55 coiled in a loose condition, enabling the separation of the convolutions thereof to a degree sufficient for the interposition of a recording head between alternate coils, each hole should be in alignment with a hole in each of the other convolutions of the coiled tape. Tape 55 and rods 53 are initially assembled on turntable 48 by inserting one of the rods through its block 52 and into the first hole 56 in tape 55 at the end of the latter at which the holes 56 are farther apart. Thereafter each rod 53 is, in succession, projected through its respective block 52 and into the next hole 56 in the tape. Thus, the outer convolution of tape 55 is fed onto its rod first, and the other inner convolutions are successively placed as the rods are, in turn, extended into the coil as it is formed. With the last convolution of the tape transfixed by the rods, the latter are projected into holes in hub 54 of turntable 48, and are secured in place by set screws 57 in the blocks.

A removable supporting plate 58 for a transmitting unit, later referred to, is loosely fitted over the upper end of spindle 42. Plate 58 is further supported and balanced in close proximity to tape 55 by means of four vertical posts 59 mounted on base 44. A slot 60 is formed in plate 58, parallel to a radius of turntable 48 and of the length sufficient to extend over each convolution of tape, through which slot 60 the pole pieces 34 of the transmitting unit are adapted to extend for operative engagement with the selected convolutions of tape, as will appear. A pair of guide rods 22, disposed parallel to plate 58 and slot 60, and at opposite sides of the latter, respectively, are supported by lugs 61 mounted on plate 58.

The transmitting unit, comprising a panel 62 on which the coils 33 are pivotally mounted, is substantially identical with that illustrated and described above with reference to Figs. 1 to 6 inclusive. The supporting panel 62 is secured at right angles to a bar 27 hinged to a lug (not shown) which is slidable on one of rods 22, whereby panel 62 may be swung in a vertical arc toward and away from plate 58. The free end of bar 27 is adapted to be latched by suitable means to a second lug 28 slidable on the other rod 22 to releasably retain the transmitting unit in its lowermost position, i. e., with panel 62 depending vertically from bar 27. As in the embodiment of Figs. 1 through 6, the coils 33 are pivoted to panel 62. With the bar 27 in a horizontal position, the pole pieces 34 of respective coils 33 project downwardly through slot 61 for engagement with opposite sides of the convolution of tape 55 over which the unit is positioned. Bifurcations 63 of the lower side of the panel 62 are formed with right angular parallel extensions 64 which flank the respective pole pieces 34 and space the convolutions of tape 55 on either side of the one, to or from which the record is to be transcribed, from contact with the poles of the magnets.

It will be observed that in this embodiment the transmitting unit is entirely supported by rods 22, and that pole pieces 34 may lightly engage opposite sides of the convolution of tape isolated by the bifurcations 63 of the panel 62. Another feature of the modified form of the invention illustrated in Figs. 7 through 10 resides in the facility with which the coiled tape may be removed from the turntable. This is accomplished by removing the plate and transmitting unit from the spindle 42 and posts 59, releasing the engagement of set screws 57 with the respective rods 53, and withdrawing the rods, whereupon tape 55 may be lifted in coiled condition from turntable 48. It will be understood, however, that in most instances where a tape is to be moved from one reproducing unit for use in another, the entire turntable 48 with rods 53 and tape 55 may be shifted with greater facility.

It will thus be seen that I have provided apparatus, comprising a steel tape and electromagnets energized by a sound current, combining means for removably supporting the tape in a flat-coiled condition upon a reel and having associated therewith means for guiding the transmitting unit in movement parallel with and adjacent to the coil of the tape, enabling the engagement of any convolution of the tape by pole pieces of the magnets whereby a magnetic sound record may be impressed on any reach of the tape, or any part of the record theretofore registered may be reproduced or deleted, said apparatus being capable of modification to enable the utilization of conventional transmitting units other than electro-magnetic devices and with tape of different material, while retaining the advantages and features of my invention above indicated.

While I have described but one embodiment of my invention, it will be apparent to those of skill in the art that numerous changes in size, design, number and proportion of the various parts may be made, as for example, the reel may be disposed horizontally with the tape overlying the spokes, whereby gravity may be utilized to assist in maintaining the proper relation between the spokes and tape, the transmitting unit may be carried on a suitable slide arranged perpendicularly to the panel, and other means may be utilized for releasably maintaining the tape in loose coils on the reel, all without departing from the scope of my invention as defined in the appended claims.

What I claim and desire to secure by Letters Patent is:

1. In a device of the character described, a tape, a reel for the tape, a transmitting unit to register a sound record on the tape, and means for supporting the transmitting unit for movement radially of and perpendicularly to the reel comprising a pair of guide rods disposed parallel to the reel and a bar, a double hinge connecting one end of said bar to one of said guide rods, and means to latch the opposite end of said bar to the other of said guide rods.

2. In a device of the character described, a reel comprising a hub and a plurality of rods radiating from said hub, a tape carried by said reel in coiled condition having means associated therewith to loosely engage said rods whereby the latter maintains the convolutions of the tape in separable relation on the reel, a transmitting unit to register a sound record on the tape, and means to carry said transmitting unit for movement into contact with, selectively, any of the spaced convolutions of the tape.

3. In a device of the character described, a tape, carrying a record to be reproduced, having a plurality of notches on one edge thereof, said notches being spaced progressively greater distances apart from one end of the tape to the other, means engageable with said notches to hold said tape in coiled condition with the convolutions thereof in spaced relation, and a reproducing device engageable with said tape to reproduce said record.

4. In a device of the character described, a tape, bearing a record to be reproduced, having a plurality of notches on one edge thereof, said notches being spaced progressively greater distances apart from one end of the tape to the other, means to support said tape in flat-coiled condition, and a plurality of rods engageable in said notches to maintain convolutions of the coiled tape in spaced relation, and a reproducing device engageable with said tape to reproduce said record.

5. In a device of the character described, a tape, bearing a record to be reproduced, having a plurality of holes therein, said holes being spaced progressively greater distances apart from one end of the tape to the other, means extending through said holes to retain said tape in coiled condition with convolutions thereof in spaced relation, and a reproducing head engageable with said tape to reproduce said record.

6. In a device of the character described, a tape, bearing a record to be reproduced, having a plurality of holes therein, said holes being spaced progressively greater distances apart from one end of the tape to the other, means to support said tape in flat-coiled condition, and a plurality of rods extending through said holes to maintain the convolutions of the coiled tape in spaced relation, and a reproducing head engageable with said tape to reproduce said record.

7. In a device of the character described, a steel tape having a plurality of holes therein, said holes being spaced progressively greater distances apart from one end of the tape to the other, means to support said tape in flat-coiled condition, means projecting through said holes to maintain the convolutions of the coiled tape in loose separable relation, a transmitting unit, and means to support said transmitting unit adjacent said coil for engagement, selectively, with any convolution thereof.

8. In a magnetic recording unit, a section of tape, bearing a record to be reproduced, having overlapping sections, a pair of rods, means to support and maintain said rods in converging relationship, and means associated with each of said overlapping sections of said tape for engagement by said rods, the latter being effective to maintain said sections of said tape within a predetermined range of movement with respect to one another, and a reproducing head engageable with said tape to reproduce said record.

9. In a device of the character described, a pair of parallel plates, a shaft projecting axially through said plates, a hub on said shaft between said plates, a coil of tape wound upon said hub between said plates, the latter protecting the sides of said tape, one of said plates having a slot therein, a transmitting unit, and means to shift said transmitting unit into engagement with said tape through said slot.

JOSEPH B. WALKER.

REFERENCES CITED

The following references are of record in the file of this patent:

UNITED STATES PATENTS

| Number | Name | Date |
|---|---|---|
| 822,222 | Poulsen | May 29, 1906 |
| 893,277 | Stuart | July 14, 1908 |
| 2,247,847 | Pfleumer | July 1, 1941 |
| 2,265,879 | Thurm | Dec. 9, 1941 |
| 2,293,229 | Walker | Aug. 18, 1942 |

FOREIGN PATENTS

| Number | Country | Date |
|---|---|---|
| 11,183 | Great Britain | 1911 |